March 6, 1945.
C. J. LENTZ ET AL
2,370,977
PROCESS FOR PRODUCING ZINC OXIDE
Filed Aug. 7, 1941
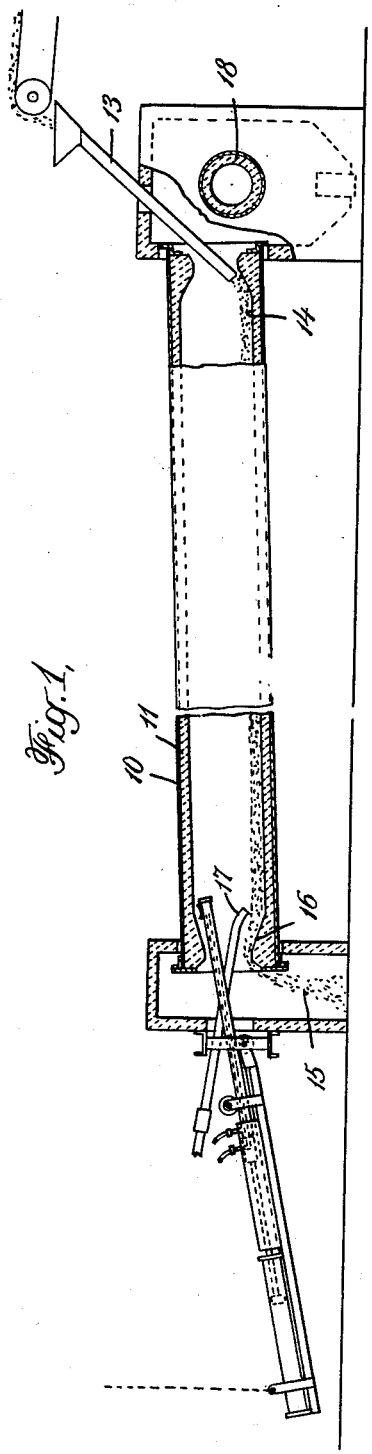
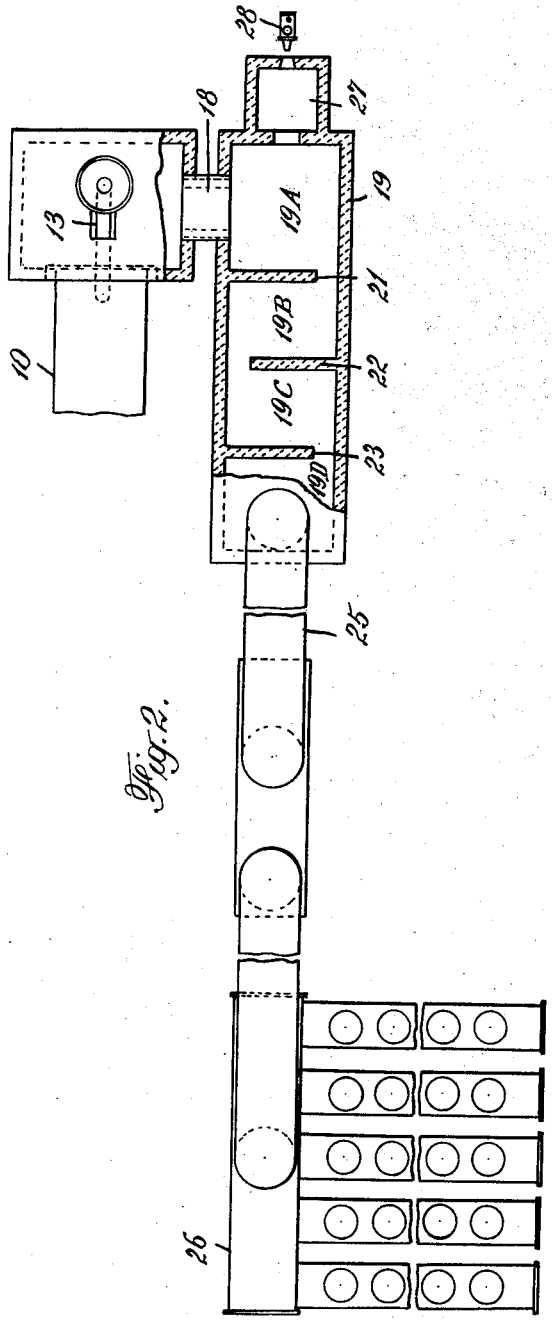
INVENTOR.
CLARENCE J. LENTZ &
GEORGE T. MAHLER
BY
ATTORNEYS Patented Mar. 6, 1945

2,370,977

UNITED STATES PATENT OFFICE 2,370,977

PROCESS FOR PRODUCING ZINC OXIDE

Clarence J. Lentz and George T. Mahler, Palmerton, Pa., assignors to The New Jersey Zinc Company, New York, N. Y., a corporation of New Jersey Application August 7, 1941, Serial No. 405,822

3 Claims. (Cl. 23—148)

This invention relates to the production of zinc oxide of high purity from zinc bearing materials of high or low grade, and contemplates the production of such zinc oxide in a Waelz kiln operation.

In Waelz kiln operations as conducted heretofore, a solid zinciferous charge containing a carbonaceous reducing agent is passed through an elongated rotary kiln that slopes slightly in the direction of passage of the charge. The charge is heated as it passes through the kiln, the zinc compounds present in the charge being reduced by the carbon so that zinc vapor is evolved. This vapor is oxidized by a current of oxidizing gas that passes through the kiln in general countercurrent contact with the charge and the resulting zinc oxide fume is removed from the end of the kiln at which the charge is introduced while the solid residue from which the zinc has been evolved is discharged from the other end of the kiln. The zinc oxide fume issuing from the kiln is sent to a bag house, electrostatic precipitator or other dust collector in which the product, consisting of low grade zinc oxide contaminated with dust from the charge and with carbon is collected. As practiced heretofore, the Waelz kiln operation has afforded a means for concentrating low grade zinciferous material, but the zinc oxide produced in the operation has been so impure and discolored that it served merely as a raw material for subsequent operations. Thus, zinc oxide from a Waelz kiln may be reduced and purified in a smelting operation to produce spelter, or it may be employed to form zinc sulfate solutions which, after purification, may be employed to form zinc pigments such as lithopone or zinc sulfide.

As a result of our investigations, we have developed certain improvements in Waelz kiln operation and control which permit the production of high grade zinc oxide directly from a charge treated in the kiln. The zinc oxide produced in accordance with our invention is comparable in quality and purity to American process zinc oxide heretofore employed in rubber compounding and paint manufacture and produced, for example, in a traveling grate furnace of the Wetherill type. Insofar as we are aware, we are the first to produce in a Waelz kiln operation a zinc oxide of such high grade.

Our invention contemplates in a Waelz kiln operation (i. e., in the recovery of zinc as oxide from a solid charge containing a carbonaceous reducing agent involving heating the charge as it travels through a Waelz kiln in which an oxidizing atmosphere is maintained, the zinc being volatilized from the charge and burned in a current of oxidizing gas to form a fume that is withdrawn from one end of the kiln while the hot solid residue is discharged from the other end of the kiln) the improvement which comprises feeding the charge into the kiln in a moist condition, or in such other condition or manner as to obviate dusting, the particles of the charge being so coarse that they do not dust substantially in the kiln but not so coarse that reduction of zinc contained in the particles requires overheating with resulting formation of heavy accretions in the kiln which cause very high gas velocity and attendant dusting, maintaining a relatively long zone of substantially uniform temperature in the kiln, passing the oxidizing gas through the kiln in a relatively slow and steady stream so as to obviate entrainment of the charge, burning the volatilized zinc in said stream to produce a fume, removing a relatively small proportion of the solids in the fume by subjecting the fume to settling treatment at an elevated temperature, for example about 700 to 900° C., and separately collecting the particles which remain in suspension during the settling treatment.

Considering the invention in greater detail, it contemplates control of the particle size of both the zinciferous material (say a franklinite concentrate) and the carbonaceous material (coal) in the charge. The particle size of the carbonaceous material is regulated in accordance with the nature of the zinciferous material, and after thorough mixing the charge is fed, preferably in a relatively moist condition, in a Waelz kiln. The kiln is operated so that the hot zone is spread out, while the oxidizing gas is passed through the kiln in countercurrent to the charge at a relatively low and steady velocity and with avoidance of turbulence so violent or of gas velocities so high as to entrain charge particles in the gases.

If the foregoing conditions are maintained, the zinc oxide fume leaving the kiln will be relatively clean and can be substantially completely purified by subjecting it to a settling treatment in a dust collector or the like, provided that the settling treatment takes place at high temperatures. If the fume issuing from the kiln is sufficiently hot, say 800° C., it may be subjected immediately to a settling treatment at this temperature. If the fume issues from the kiln at a substantially lower temperature, it must be heated prior to settling treatment, for example, by means of an oil or gas flame directed into the fume. Assuming that the fume subjected to settling is maintained in a suitable temperature range, say 800 to 900° C. by reason of a high temperature at the point where it issues from the kiln or as a result of additional heating from an extraneous source, the zinc oxide that remains suspended in the fume during the settling treatment will have a good color and will be of high purity, while the impurities in the fume will settle out with but a small proportion of the total zinc oxide in the fume, e. g., 4% of the zinc content of the charge. If the fume subjected to the settling treatment is not sufficiently hot, the zinc oxide product that remains suspended will tend to have a greenish cast and at the same time be contaminated with carbon and ore fines or the like derived from the zinciferous portion of the charge. If the fume subjected to settling is too hot, say in excess of 900° C., the solid impurities such as coal and ore dust will be separated in the settler, but the zinc oxide will have a yellowish cast.

After purification by settling at high temperature, the fume remaining in suspension is cooled and the zinc oxide is collected in conventional equipment, say, a bag house. The cooling may be accomplished conveniently by admitting cold clean air to the flue system through which the fume passes to the bag house. In order to avoid contamination of the fume during cooling, the air admitted preferably is cleaned by filtration and the flue system through which the fume travels to the bag house should be made tight, as by welding the joints therein, so that unfiltered air does not leak into the fume.

As indicated hereinbefore, in the practice of our invention the character of the charge treated is important. Thus, the particles of the zinciferous portion of the charge should be neither too coarse nor too fine. If the particles are too coarse, the charge has to be heated too high in order to drive out the zinc. This overheating of the charge causes rapid formation of accretions which bring about an increase in gas velocity through the kiln and increased dusting. If the charge is too fine, dusting is also increased. The optimum size of the zinciferous particles will depend upon the nature of the charge. In general, however, the optimum particle size is in the neighborhood of 35 mesh.

The carbonaceous material, say coal, included in the charge must be sized to suit the charge of zinciferous material, say ore. If the coal is too coarse, it rides on the charge passing through the furnace instead of in it, reducing contact and interaction of the ore and carbonaceous material. On the other hand, if the coal is too fine, it tends to dust excessively with resultant contamination of the zinc oxide. With a view toward producing zinc oxide of high purity, a coal of low ash content is preferred.

We have discovered that lime added to the charge greatly facilitates the production of zinc oxide of high grade due, we believe, to the antifluxing and binding action of the lime upon the charge and also perhaps to chemical effects of the lime. Thus, it is desirable to include in the charge to the Waelz kiln a substantial proportion of lime, say 3% by weight of the charge. The lime preferably is in a finely divided form so that it tends to form a coating on the charge particles. However, whether or not the lime is finely divided, it tends to reduce the tendency of the charge to cake through sintering and thus tends to decrease the formation of accretions in the kiln. Accretions should be avoided because they cause turbulence and local high velocity of gas flow which in turn cause dusting. The presence of the lime also facilitates reduction of the zinc.

As indicated above, the lime preferably is in finely divided form and may be hydrated lime, unslacked lime, or limestone, i. e., calcium hydroxide, calcium oxide or calcium carbonate. If the lime employed is in a relatively coarse condition, i. e., not in a form adapted to coat the individual particles of the charge, a binder in the form of a small proportion, say 1%, of waste sulfite liquor (produced in paper pulp manufacture) should be employed. Thus, crushed limestone in proportions about 10% on the weight of the charge and of a particle size in the range of about 14 to 35 mesh gives good results if incorporated in the charge with 1% (by weight of the charge) of waste sulfite liquor.

It is important to prevent dusting on introducing the charge into the kiln. Quite aside from the advantage which a damp charge affords in facilitating the coating of the particles thereof with lime, a substantial proportion of moisture in the charge aids in reducing the tendency towards dusting, especially at the point where the charge is run into the kiln. With many ores the moisture content of the charge will range from 5% to about 8% by weight. Dusting may, however, be obviated by pelletizing or nodulizing the charge, in which case the pelleted or nodulized charge may be fed in dry form into the kiln without dusting.

Passing now to a consideration of the character of the current of oxidizing gas passing through the kiln, it will be recalled that the velocity of this gas should be both slow and uniform. The low gas velocity combined with a relatively high kiln capacity will, in general, require a kiln that is relatively large in cross-section in proportion to its length. Generally speaking, a kiln with a diameter approximately one-eighth of the kiln length is desirable. In order that the gas velocity be both low and uniform, it is necessary to avoid constriction in the kiln such as would be brought about by accumulations of large accretions on the interior. The effect of the constrictions is to suddenly increase the velocity at localities within the kiln or to create a turbulent condition, both of which cause dusting.

Another important factor in the practice of our invention is the maintenance of a relatively low and uniform heat gradient between the two ends of the kiln. Thus, it is desirable to "spread out" the zone of high temperature in the kiln over as great a length as possible. The zinc oxide fume issuing from the kiln should have a much higher temperature than that prevailing heretofore in Waelz kiln operations in order to produce zinc oxide of good color and to facilitate removal of impurities by settling. At the same time, the end of the kiln at which the oxidizing air enters also should be highly heated. Conveniently, this is accomplished in accordance with the invention of Ernest W. Steckel and George T. Mahler described and claimed in United States Patent No. 2,310,471, issued February 9, 1943. In accordance with this invention, the solid residue of the Waelz kiln operation is treated just prior to discharge from the kiln with a blast of oxidizing gas to produce a zone of intense heat, further oxidizing gas being introduced into the kiln through said zone. The intense heat is produced by the oxidation of residual carbon in the residue and also by the oxidation of any iron or other metal in the residue. However, in operating a Waelz kiln to produce high grade zinc oxide for use as a pigment in coating compositions or as a rubber compounding agent, excessively vigorous blasting should be avoided, because this tends to affect deleteriously the color of the oxide, for example, by imparting to it a yellowish cast.

Our invention will be more thoroughly understood in the light of the accompanying drawing, taken in conjunction with the following practical example, in which the Waelz kiln employed is a pilot apparatus approximately 60 feet long with an outside diameter of 6 feet.

Fig. 1 is an elevation view, partly in section, of a Waelz kiln of the type suitable for carrying out the process of this invention; and Fig. 2 is a cross-sectional plan view, showing in detail the settling chamber and baghouse.

The kiln 10 is provided with a refractory lining 11 about ½ foot thick, so that the internal diameter of the kiln is about 5 feet. Means 13 are provided for feeding a solid charge 14 into the high end of the kiln and residue 15 is discharged from the other end of the kiln over an annular dam 16 about 12 inches high. The discharge end of the kiln is provided with a blast pipe 17 for directing a blast of air onto the hot residue just as it leaves the kiln as described and claimed in the aforementioned co-pending application Ser. No. 349,274 of Steckel and Mahler. The blasting of the residue creates a hot zone through which additional air is introduced from the open discharge end so that the air is, in effect, preheated.

The kiln may also be provided with means, such as a peripheral bustle pipe and a plurality of tuyères (not shown), for introducing controlled amounts of air into a mid-point of the kiln.

The feed end of the kiln from which the zinc oxide fume issues opens into a short flue 18, which discharges into a settling chamber 19. This chamber comprises four compartments 19A, 19B, 19C, 19D about 12 feet high, 7 feet wide and 5 feet long which are separated from each other by vertical baffles 21, 22, 23 extending from top to bottom of the chamber. The odd numbered baffles, 21, 23 have 1 foot slots at one side of the chamber and the even numbered baffle 22 has a similar slot at the other side of the chamber, so that the fume passing through the chamber is forced to follow a path that is tortuous as viewed in plan.

Other forms of dust collection apparatus may also be employed, such as cyclones, but the form just described has proved to be highly efficient in settling out impurities with a minimum settling of zinc oxide, possibly because the fume is not forced to go upward and downward as would be the case if the fume had to travel above and below alternate baffles, in which case the upward movement of the fume would oppose settling.

The fume passes from the last compartment of the settler into a tight sheet iron pipe 25 and thence to a bag house 26. In the pipe the fume is cooled both by radiation and by dilution with cold filtered air.

A dutch oven 27 equipped with an oil burner 28 opens into the first compartment of the settling chamber. Operation of the burner provides a current of intensely hot gas which can be mixed with the fume from the kiln and raise its temperature to the optimum, say 900° C., when necessary.

The zinciferous portion of the charge fed to the kiln comprises, in this practical example, a franklinite concentrate containing about 16.5% zinc and having the following screen size:

| | Per cent |
|---|---|
| +14 mesh | 0.0 |
| +20 mesh | 0.7 |
| +28 mesh | 2.3 |
| +35 mesh | 18.7 |
| +48 mesh | 22.2 |
| +65 mesh | 18.6 |
| +80 mesh | 8.3 |
| +100 mesh | 7.4 |
| +150 mesh | 10.2 |
| +200 mesh | 6.1 |
| +325 mesh | 3.7 |
| −325 mesh | 1.8 |
| | 100.0 |

About 80 parts by weight of the concentrate are combined with about 15 parts by weight of coal and 3 to 10 parts by weight of finely divided calcareous material (lime), which may be hydrated lime, unslacked lime or limestone.

As indicated above, the coal comprises only about 15% of the total charge. It should have a low ash content and for a franklinite charge of the foregoing screen analysis a coal of the following screen analysis is suitable:

| | Per cent |
|---|---|
| +10 mesh | 10.0 |
| +14 mesh | 33.0 |
| +48 mesh | 55.0 |
| −10 mesh } | |
| −14 mesh } | 2.0 |
| −48 mesh } | |

When hydrated lime is employed only about 3 parts by weight are required for each 80 parts of zinciferous material or about 3% of the total charge. When burned lime or limestone is employed higher proportions are desirable. Thus, it was found that about 10 parts of finely ground mill tailing consisting principally of calcite were required in order to obtain the beneficial results derived from the use of about 3 parts of hydrated lime.

By using sulfite liquor as binder in the charge along with relatively coarse limestone, a zinc oxide product of a grade nearly equal to that secured by the use of finely divided hydrated lime can be obtained.

The lime, in whatever form, preferably should be finely divided so that it is capable of coating the particles of charge and, generally speaking, the finer the lime the better is the operation and the character of zinc oxide produced. The lime preferably should coat the zinciferous particles of the charge or at least a large proportion of these particles and may also coat the carbonaceous particles in the charge. Coating of the particles is obtained by agitating the moist charge including the lime in a conventional type of mixing equipment, for example, a cement mixer.

The charge as prepared above contains about 13½% zinc. It is charged into the pilot Waelz kiln at a rate of 2¾ to 3½ tons of dry charge per hour, so that the total zinc charged amounts to .4 to .5 ton per hour.

The kiln is turned at a speed of about .75 R. P. M. Air is supplied to the blast at the discharge of the furnace at the rate of about 600 to 800 cubic feet per minute at a static head of about 1.4 to 2.2 inches of mercury. Additional air may be introduced into the kiln near the mid-point thereof, the amount of air so introduced being about ¼ to ½ the volume of the air employed in blasting the residue.

A slight suction, about .04 to about .1 inch of water, is maintained in the discharge end of the kiln by means of a fan in the pipe-line between the settling chamber and the bag house. This slight suction causes additional air to flow into the discharge end of the kiln through the hot zone created by the blasting. The total air introduced into the kiln amounts to about 1800 cubic feet per minute. The average velocity of the current of gas passing through the kiln to the settler is about 8 to 10 feet per second.

The temperature at the discharge end of the kiln may range from 1100 to 1300° C. and at the fume outlet of the kiln (the opposite end) the temperature may range from about 800 to about 950° C. It is desirable to maintain a substantially uniform temperature gradient between the two ends of the kiln and the introduction of air at mid-point may aid in maintaining such a gradient.

Constriction of the kiln by the formation of accretions on its walls is undesirable because such accretions create a high local velocity and a turbulent condition which increases dusting. The use of lime aids greatly in preventing the formation of accretions, but these may still form in the hot zone created by blasting at the discharge end of the kiln unless some device such, for example, as the mechanical barring apparatus described and claimed in the aforementioned co-pending application is employed.

The temperature of the fume issuing from the kiln should be such that the fume in the settler will have a temperature in the range of about 800 to 900° C. With some charges, it may be difficult if not impossible to maintain such a temperature at the fume outlet and in such case the oil burner is employed to heat the fume to the desired temperature for settling.

Only a very small proportion of the zinc oxide is commingled with the grit and impurities removed in the settler.

It is believed that the settling of the impurities with only a small proportion of the zinc oxide may be due to the high temperature of settling, which tends to prevent agglomeration of zinc oxide particles to form coarse aggregates which would settle with the impurities.

When the operation is conducted as described above, about 4% of the total zinc in the feed will be collected as zinc oxide in the settling chamber. The material collected in the settling chamber contains about 35 to 65% zinc.

The zinc oxide product which passes through the settler and is collected in the bag house is very pure, containing about 80% zinc, and is comparable in chemical analysis to American process zinc oxide produced on a Wetherill grate, or the like, and employed heretofore as a rubber compounding agent. In texture, the zinc oxide product collected in the bag house is excellent, being substantially free from gritty particles. The zinc oxide product tends to be of slightly smaller particle size than American process zinc oxide of comparable purity. However, the zinc oxide produced in accordance with our invention on a Waelz kiln may be made coarser or finer, depending upon the conditions prevailing in the kiln during the combustion of the zinc vapor. Generally speaking, the more intense the combustion, the coarser is the oxide. Zinc oxide produced in accordance with our invention tends to be somewhat more acicular than American process zinc oxide of comparable purity.

The high grade zinc oxide produced in accordance with our invention behaves in rubber compounding operations in much the same manner as American process zinc oxide of comparable purity. It is of excellent color, provided that the furnace conditions are properly maintained and provided further than the settling is conducted at a proper temperature. If the temperature of settling drops below about 800° C., the zinc oxide tends to develop a greenish cast. At a settling temperature in excess of about 900° C., the zinc oxide tends to have a yellowish cast. The yellowish cast of the zinc oxide may not be objectionable in some uses, say in rubber compounding, so that in the practice of our invention the temperature of settling may be allowed to rise over the preferred limit, i. e., 950° C.

The following may be considered a typical analysis of zinc oxide produced in the foregoing operation:

|  | Per cent |
|---|---|
| Zn | 80 |
| Mn | .007– .014 |
| Pb | .08 |
| Fe | .04 – .08 |
| Cl | .0 – .04 |
| Total lime | .04 – .05 |
| Total S as SO$_3$ | .2 – .3 |
| Acidity | .16 – .20 |
| Insoluble in acetic acid | .06 – .27 |
| Water soluble salts | .5 – .6 |

The zinc oxide product of the foregoing composition is satisfactory as to color, brightness, smoothness and freedom from specks. Rubber compounding tests conducted with the oxide showed it to be similar to high grade commercial American process zinc oxide (such for example as The New Jersey Zinc Company's XX Red-4) in curing rate and re-enforcing values.

The process of our invention affords numerous commercial advantages as compared with the manufacture of comparable zinc oxide in apparatus heretofore employed for this purpose. Thus, the manufacture of high grade zinc oxide in a Waelz kiln affords numerous advantages over the manufacture of similar oxide in a travelling grate furnace of the Wetherill type. Among these advantages may be noted a much lower fuel consumption, a much greater capacity of apparatus and the fact that the raw material employed may have a zinc content much lower than that which can be treated in Wetherill grates and the like.

We claim:
1. In the recovery of zinc oxide from a solid charge containing zinciferous material and a carbonaceous reducing material involving heating the charge as it travels through a Waelz kiln in countercurrent relation to an oxidizing gas with the volatilization of the zinc and its oxidation to zinc oxide fume which is removed from one end of the kiln while the solid residue is discharged from the other end of the kiln, in which conditions are maintained so as to keep the walls of the kiln relatively free from accretions, the fume relatively free of entrained particles of the charge, and the temperature substantially uniform, the improvement which comprises subjecting the fume to a settling treatment at a temperature in the range of 700° C. to 900° C. and removing a relatively small proportion of solids therefrom, and separately collecting the particles of fume which remain in suspension during the settling treatment.

2. In the method of claim 1, passing the oxidizing gas through the kiln at a velocity of from 8 to 10 feet per second and using a charge substantially free of zinciferous particles coarser than 14 mesh and finer than 200 mesh; whereby the zinciferous material is substantially completely reduced and solid particles are not appreciably entrained in the gas.

3. In the method of claim 1, removing solid particles in the settling treatment containing not more than 4% of the zinc in the charge.

CLARENCE J. LENTZ.
GEORGE T. MAHLER.